(12) United States Patent
Scanlon

(10) Patent No.: US 12,475,894 B2
(45) Date of Patent: Nov. 18, 2025

(54) METHODS AND SYSTEMS FOR PROCESSING AUDIO SIGNALS CONTAINING SPEECH DATA

(71) Applicant: Curriculum Associates LLC, North Billerica, MA (US)

(72) Inventor: Patricia Scanlon, Dublin (IE)

(73) Assignee: SoapBox Labs Ltd., Dublin (IE)

( * ) Notice: Subject to any disclaimer, the term of this patent is extended or adjusted under 35 U.S.C. 154(b) by 115 days.

(21) Appl. No.: 18/217,411

(22) Filed: Jun. 30, 2023

(65) Prior Publication Data

US 2024/0185860 A1 Jun. 6, 2024

Related U.S. Application Data

(63) Continuation of application No. 17/700,369, filed on Mar. 21, 2022, now Pat. No. 11,694,693, which is a (Continued)

(30) Foreign Application Priority Data

Oct. 18, 2017 (EP) .................................... 17197187

(51) Int. Cl.
*G10L 17/04* (2013.01)
*G06F 16/61* (2019.01)
(Continued)

(52) U.S. Cl.
CPC .............. *G10L 17/04* (2013.01); *G06F 16/61* (2019.01); *G06F 16/636* (2019.01); (Continued)

(58) Field of Classification Search
CPC ......... G10L 15/25; G10L 17/04; G10L 17/10; G06F 16/61; G06F 16/636; G06F 21/32; G06Q 30/0185; G06Q 50/265
See application file for complete search history.

(56) References Cited

U.S. PATENT DOCUMENTS 4,091,242 A 5/1978 Carrubba et al.
5,029,214 A 7/1991 Hollander
(Continued)

FOREIGN PATENT DOCUMENTS

JP 2009237256 A 10/2009
JP 2020030739 A 2/2020
(Continued)

OTHER PUBLICATIONS

Kepuska, V.,Z., & Rojanasthien, P., "Speech corpus generation from DVDs of movies and TV series", 2011, Journal of International Technology and Information Management, 20(1), 49-82 (Year: 2011).

(Continued)

*Primary Examiner* — Eric Yen
(74) *Attorney, Agent, or Firm* — Lowenstein Sandler LLP

(57) ABSTRACT

Methods and systems for processing audio signals containing speech data are disclosed. Biometric data associated with at least one speaker are extracted from an audio input. A correspondence is determined between the extracted biometric data and stored biometric data associated with a consenting user profile, where a consenting user profile is a user profile indicates consent to store biometric data. If no correspondence is determined, the speech data is discarded, optionally after having been processed.

20 Claims, 4 Drawing Sheets

Related U.S. Application Data continuation of application No. 16/852,383, filed on Apr. 17, 2020, now Pat. No. 11,282,526, which is a continuation of application No. PCT/EP2018/078470, filed on Oct. 18, 2018.

(51) Int. Cl.

| | | |
|---|---|---|
| *G06F 16/635* | (2019.01) | |
| *G06F 21/32* | (2013.01) | |
| *G06Q 30/018* | (2023.01) | |
| *G06Q 50/26* | (2024.01) | |
| *G10L 15/25* | (2013.01) | |
| *G10L 17/10* | (2013.01) | |

(52) U.S. Cl.
CPC ....... *G06Q 30/0185* (2013.01); *G06Q 50/265* (2013.01); *G10L 15/25* (2013.01); *G10L 17/10* (2013.01); *G06F 21/32* (2013.01)

(56) References Cited

U.S. PATENT DOCUMENTS

| | | | |
|---|---|---|---|
| 5,623,539 | A | 4/1997 | Bassenyemukasa et al. |
| 5,832,100 | A | 11/1998 | Lawton et al. |
| 5,873,061 | A | 2/1999 | Hab-Umbach et al. |
| 5,991,429 | A * | 11/1999 | Coffin .................. G06V 40/166 |
| | | | 382/118 |
| 6,067,521 | A | 5/2000 | Ishii et al. |
| 6,219,639 | B1 | 4/2001 | Bakis et al. |
| 6,314,401 | B1 | 11/2001 | Abbe et al. |
| 6,554,705 | B1 | 4/2003 | Cumbers |
| 6,567,775 | B1 | 5/2003 | Maali et al. |
| 6,826,306 | B1 | 11/2004 | Lewis et al. |
| 7,343,553 | B1 | 3/2008 | Kaye |
| 8,054,969 | B2 | 11/2011 | Adhikari et al. |
| 8,463,488 | B1 | 6/2013 | Hart |
| 8,688,306 | B1 | 4/2014 | Nemec et al. |
| 8,700,392 | B1 | 4/2014 | Hart et al. |
| 9,070,367 | B1 | 6/2015 | Hoffmeister et al. |
| 9,443,514 | B1 | 9/2016 | Taubman |
| 9,881,613 | B2 | 1/2018 | Weinstein |
| 10,178,301 | B1 | 1/2019 | Welbourne et al. |
| 11,138,334 | B1 | 10/2021 | Garrod et al. |
| 2002/0007278 | A1 | 1/2002 | Traynor |
| 2002/0010588 | A1 | 1/2002 | Fujimori |
| 2002/0111809 | A1 | 8/2002 | McIntosh |
| 2002/0116197 | A1 | 8/2002 | Erten |
| 2002/0120866 | A1 | 8/2002 | Mitchell et al. |
| 2003/0097353 | A1 | 5/2003 | Gutta et al. |
| 2004/0003142 | A1 | 1/2004 | Yokota et al. |
| 2005/0060412 | A1 * | 3/2005 | Chebolu ............. G06F 9/44505 |
| | | | 709/227 |
| 2005/0096926 | A1 | 5/2005 | Eaton et al. |
| 2005/0185779 | A1 | 8/2005 | Toms |
| 2005/0193093 | A1 | 9/2005 | Mathew et al. |
| 2005/0240582 | A1 | 10/2005 | Hatonen et al. |
| 2006/0173793 | A1 | 8/2006 | Glass |
| 2006/0222210 | A1 * | 10/2006 | Sundaram ............... G06F 18/28 |
| | | | 704/E17.006 |
| 2006/0259305 | A1 | 11/2006 | Pietruszka |
| 2007/0211921 | A1 | 9/2007 | Popp et al. |
| 2007/0218955 | A1 | 9/2007 | Cook et al. |
| 2007/0255564 | A1 * | 11/2007 | Yee ........................ G10L 17/24 |
| | | | 704/E17.016 |
| 2008/0004876 | A1 | 1/2008 | He et al. |
| 2008/0235162 | A1 | 9/2008 | Spring |
| 2008/0269958 | A1 * | 10/2008 | Filev ...................... G06N 3/006 |
| | | | 701/1 |
| 2009/0122198 | A1 | 5/2009 | Thorn |
| 2009/0173786 | A1 | 7/2009 | Hatkoff |
| 2009/0185723 | A1 | 7/2009 | Kurtz et al. |
| 2010/0088096 | A1 | 4/2010 | Parsons |
| 2010/0233660 | A1 | 9/2010 | Skala et al. |
| 2011/0235870 | A1 * | 9/2011 | Ichikawa ................ G06F 21/32 |
| | | | 382/118 |
| 2011/0243449 | A1 | 10/2011 | Hannuksela et al. |
| 2012/0047560 | A1 | 2/2012 | Underwood et al. |
| 2012/0253811 | A1 | 10/2012 | Breslin et al. |
| 2012/0297284 | A1 | 11/2012 | Matthews et al. |
| 2012/0323694 | A1 | 12/2012 | Lita et al. |
| 2013/0162752 | A1 | 6/2013 | Herz et al. |
| 2013/0185220 | A1 | 7/2013 | Good et al. |
| 2013/0204607 | A1 | 8/2013 | Forrest |
| 2013/0218566 | A1 | 8/2013 | Qian et al. |
| 2013/0317817 | A1 | 11/2013 | Ganong et al. |
| 2014/0004826 | A1 | 1/2014 | Addy et al. |
| 2014/0136215 | A1 | 5/2014 | Dai et al. |
| 2014/0254778 | A1 * | 9/2014 | Zeppenfeld ......... H04M 3/5183 |
| | | | 379/88.02 |
| 2014/0278366 | A1 | 9/2014 | Jacob et al. |
| 2014/0288932 | A1 | 9/2014 | Yeracaris et al. |
| 2014/0337949 | A1 | 11/2014 | Hoyos |
| 2014/0376786 | A1 | 12/2014 | Johnson et al. |
| 2015/0073810 | A1 | 3/2015 | Nishio et al. |
| 2015/0088515 | A1 | 3/2015 | Beaumont et al. |
| 2015/0149174 | A1 | 5/2015 | Gollan et al. |
| 2015/0194155 | A1 | 7/2015 | Tsujikawa et al. |
| 2015/0220716 | A1 | 8/2015 | Aronowitz et al. |
| 2015/0269943 | A1 | 9/2015 | VanBlon et al. |
| 2015/0278922 | A1 | 10/2015 | Isaacson et al. |
| 2015/0301796 | A1 | 10/2015 | Visser et al. |
| 2015/0332041 | A1 | 11/2015 | Maruyama |
| 2015/0340025 | A1 | 11/2015 | Shima |
| 2015/0371637 | A1 | 12/2015 | Neubacher et al. |
| 2016/0019372 | A1 | 1/2016 | Clark |
| 2016/0063235 | A1 | 3/2016 | Tussy |
| 2016/0063314 | A1 | 3/2016 | Samet |
| 2016/0203699 | A1 | 7/2016 | Mulhern et al. |
| 2016/0225048 | A1 | 8/2016 | Zoldi et al. |
| 2016/0234024 | A1 * | 8/2016 | Mozer .................. H04L 9/3231 |
| 2016/0361663 | A1 | 12/2016 | Watry |
| 2017/0061959 | A1 | 3/2017 | Lehman et al. |
| 2017/0069327 | A1 * | 3/2017 | Heigold .................. G10L 17/18 |
| 2017/0133018 | A1 * | 5/2017 | Parker .................... G10L 17/24 |
| 2018/0129795 | A1 * | 5/2018 | Katz-Oz ................. H04L 63/10 |
| 2018/0144742 | A1 | 5/2018 | Ye et al. |
| 2018/0204209 | A1 * | 7/2018 | Kohli .................. G06Q 20/363 |
| 2018/0204577 | A1 | 7/2018 | DeMerchant et al. |
| 2018/0210874 | A1 | 7/2018 | Fuxman et al. |
| 2018/0349684 | A1 * | 12/2018 | Bapat ................. G08B 13/1966 |
| 2018/0366125 | A1 | 12/2018 | Liu et al. |
| 2019/0095867 | A1 | 3/2019 | Nishijima et al. |
| 2019/0213278 | A1 | 7/2019 | Min |
| 2019/0220662 | A1 | 7/2019 | Dawoud |
| 2019/0259388 | A1 | 8/2019 | Robley et al. |
| 2019/0378171 | A1 | 12/2019 | Bhat et al. |
| 2020/0110443 | A1 * | 4/2020 | Leong .................... G06F 1/1686 |
| 2020/0335098 | A1 | 10/2020 | Saito |
| 2021/0266734 | A1 | 8/2021 | Kapinos et al. |

FOREIGN PATENT DOCUMENTS

| | | | |
|---|---|---|---|
| WO | 2005042314 | A1 | 5/2005 |
| WO | 2015161240 | A2 | 10/2015 |

OTHER PUBLICATIONS

Google Patents Translation of JP-2020030739-A, https://patents.google.com/patent/JP2020030739A/en?oq=JP-2020030739-A (Year: 2020).

Google Patents Translation of JP-2009237256-A, https://patents.google.com/patent/JP2009237256A/en?oq=JP-2009237256-A (Year: 2009).

PCT International Search Report and Written Opinion for International Application No. PCT/US2018/078470 mailed Apr. 12, 2019, 17 pages.

* cited by examiner

Profile and Biometric Data Storage

| Profile 0001 ||
|---|---|
| Name | Anna |
| App store ID | - |
| Account type | Child |
| Consent to store speech | Yes |
| Consent to upload to server | Yes |
| Consent to share with third party | No |
| Consent given by | Profile 0003 |
| Consent record signature | 822c4bac4490f2e106 a6eec44b87c96 |
| Biometric file ID | bio_anna_pr_0001_ 20171001 |

| Profile 0002 ||
|---|---|
| Name | Dylan |
| App store ID | - |
| Account type | Child |
| Consent to store speech | No |

| Profile 0003 ||
|---|---|
| Name | Mark |
| App store ID | mark80@example.com |
| Account type | Verified adult |
| Consent to store speech | Yes |
| Consent to upload to server | No |
| Consent to share with third party | No |
| Consents given to | Profile 0001, Profile 0006 |
| Biometric file ID | bio_mark_pr_0003_ 20161225 |

Biometric Data Files bio_mark_pr_0003_20161225 bio_anna_pr_0001_20171001

Fig. 2

METHODS AND SYSTEMS FOR PROCESSING AUDIO SIGNALS CONTAINING SPEECH DATA

RELATED APPLICATIONS

This application is a continuation application of U.S. patent application Ser. No. 17/700,369, filed Mar. 21, 2022, which is a continuation of U.S. patent application Ser. No. 16/852,383, filed Apr. 17, 2020, now U.S. Pat. No. 11,282,526, which is a continuation of International Patent Application No. PCT/EP2018/078470, filed Oct. 18, 2018, which claims the benefit of priority from EP Patent Application No. 17197187.2 filed Oct. 18, 2017, each of which is incorporated herein by reference.

TECHNICAL FIELD

This invention relates to the field of speech processing and the storage of speech data.

BACKGROUND ART

The use of speech to interact with and control computerised systems is widespread and is rapidly growing. Companies providing speech-controlled services and researchers developing better speech-responsive systems have a huge appetite for as much speech data as they can acquire for the purposes of analysis, language model training, and research into how users interact with such systems in general. One reason they may wish to do this is that it helps them label a user's data so that they can build better more personalised models for a user for improved performance and also to record changes in voice over time as people age.

In short, speech data is enormously valuable. Almost all companies or institutions who acquire speech data will wish to save it unless they have committed not to or are not permitted to. At the same time there is a tension with legislation and user expectations regarding data protection and privacy.

A particular problem arises in relation to the speech data of minors. Many jurisdictions have laws requiring those collecting and processing data, including speech data, to obtain informed consent from the user of a service or product. Minors who are below the age of consent are typically not regarded as being capable of giving such consent, which must be obtained instead from a parent or guardian. In the USA, the Children's Online Privacy Protection Act of 1998 (COPPA) requires website operators to obtain verifiable parental consent, and to delete large quantities of data collected from under-13s. Similar provisions are in force in the EU under the General Data Protection Regulation (GDPR). Due to the difficulties in compliance, most social media companies and online services operating in the USA prohibit their use by under-13s. Several companies have been subjected to lawsuits for not complying properly with the requirements of COPPA.

Under the GDPR, where the processing of data is subject to consent having been given, and where the data subject is a child (under 13 to under 16 according to national law) then the data processor must obtain the consent of someone having parental responsibility, with that consent being verified by making reasonable efforts "taking into consideration available technology". Also under the GDPR, special protections are given to the processing of biometric data, which can include voice pattern characteristics. A further implication of GDPR is that the personal data of not just children but also adults must be handled appropriately, with the same special protection for biometric data.

Even where verifiable parental consent has been obtained from a parent of a child, difficulties arise in relation to the retention of data. The child for whom consent has been obtained may be in the company of children for whom no consent has been obtained, and speech data ostensibly collected from a particular child may include or be entirely the speech of another child (or indeed of an adult who has not given consent). As a result even the acquisition of informed consent is not a reliable safeguard that data acquired is safe to process or store.

One toymaker was sued in such circumstances by the parents of a child who played with an interactive toy owned by another child (the latter's parents having given consent but the former's parents not having done so). The toy in question recorded and uploaded speech data over the internet to the company which had stored it for long-term use, and in so doing was alleged to have violated the informed verifiable consent requirements of COPPA.

The same or similar problems may arise for users who are not minors, i.e. regardless of COPPA, the GDPR or any other legislation. Privacy rules are in a state of development and could in the future apply to adults in the same way as to children. Companies might wish to strengthen their own data handling policies for other reasons, such as for ethical reasons, or to comply with non-legislative standards, or simply to market themselves as being more aware of and concerned with user privacy.

DISCLOSURE OF THE INVENTION

There is provided in one aspect, a method of processing an audio signal containing speech data in a computing system, comprising the steps of:
  processing an audio signal containing speech data from at least one speaker to extract biometric data associated with said at least one speaker;
  determining whether said extracted biometric data matches stored biometric data associated with a consenting user profile, wherein a consenting user profile is a user profile associated with a record indicating consent to store biometric data;
  if a match is determined to exist between said extracted biometric data and a consenting user profile, performing one or both steps of:
    (i) processing the speech data; and
    (ii) storing the speech data in an archive;
  if a match is not determined to exist between said extracted biometric data and a consenting user profile:
    deleting the speech data within a predetermined time period.

The use of biometric data associated with profiles for which consent has been recorded allows providers of services, products and websites that intend to collect speech data with a high degree of confidence that the data being stored is "safe". Speech that does not match with a consenting user profile is deleted, usually after it has been processed, or within a suitable timeframe to avoid legal repercussions.

While a primary application of the invention is to the processing of speech data from children and legal minors, it will be appreciated that the invention is not so limited and that increasingly it has application in the processing of the speech data of all potential users of a system or service.

Preferably, if the extracted biometric data includes biometric data associated with more than one speaker, said step of determining a match comprises determining if the biometric data of each of said speakers matches biometric data associated with a respective consenting user profile.

In this way, the problem of multiple voices being captured is addressed.

Further, preferably, if the biometric data of each of said speakers does not match biometric data associated with a respective consenting user profile, a match is determined not to exist and the speech data is deleted within a predetermined period of time.

In this way, if one takes the example of a child and her friend both playing with a toy that collects speech data or interacting with a web service that processes speech data, the speech collected can be tagged for deletion unless each voice detected corresponds to a consenting user profile. This greatly strengthens the position of providers of these services and manufacturers of such products to ensure that they are compliant in all circumstances, even when the product or service is used by a non-consenting person while logged into a consenting person's account.

In an alternative approach, if the extracted biometric data includes biometric data associated with more than one speaker, the method may be implemented such that a match is determined not to exist and the speech data is deleted within a predetermined period of time.

Preferably, if a match is not determined to exist between said extracted biometric data and a consenting user profile, the speech data is deleted without being processed further.

This approach is particularly applicable in circumstances where there is a regulatory reason not to process the data of an individual for whom consent cannot be confirmed. It may also be preferred even where such processing is not prohibited, as an added privacy and data security feature.

In some embodiments, said predetermined time period is immediately after determining the match not to exist.

Thus, immediate deletion of the speech data may be the preferred option, particularly in jurisdictions where there is a prohibition on processing a subject's data, and where storing data is considered to be processing. By "immediately" we mean as soon as is practically possible.

Of course the system designer may choose any suitable retention period for the speech data. For example if retention of data is permitted for three days, then that may be set as a maximum retention period.

In certain embodiments, if a match is not determined to exist between said extracted biometric data and a consenting user profile, the speech data is processed before being deleted within said predetermined time period.

For example, a device may be programmed to interact with and respond to speech data using local processing resources on the device. Speech data in such circumstances may be buffered and processed, subjected to speech recognition or command recognition, and appropriate action taken (e.g. to execute a command or to respond to the user), without the data being stored further or transmitted to a remote location or centralised processor. The buffered data may be deleted immediately or retained for a short period of time, e.g. for the remainder of the user session or until a timeout period is reached.

Preferably, said predetermined time period in this instance is immediately after processing the speech data.

The method may further include the initial step of creating a consenting user profile, wherein creating a consenting user profile comprises:

verifying the credentials of a first user of the computing system against a data source to ensure that the first user is authorised to provide consent to store speech data;

initialising a user profile associated with a second user, on the instruction of the first user;
receiving speech data of the second user;
extracting biometric data from said second user speech data;
storing said biometric data and associating said biometric data with said user profile; and
storing said user profile as a consenting user profile.

The first user may also have a user profile initialised in similar manner after the step of verifying the credentials of the first user. In this way, an adult providing consent can do so both for herself (first user) and for a minor (second user).

Preferably, the step of determining whether said extracted biometric data matches stored biometric data further comprises matching additional non-speech biometric data acquired during the same use of the system by the same user against stored non-speech biometric data associated with a consenting user profile.

Preferably, said additional non-speech biometric data is selected from:
a. image data of the user's face;
b. iris pattern data;
c. fingerprint data;
d. hand geometry data;
e. palm blood vessel pattern data
f. retinal blood vessel pattern data;
g. mouth movement data; or
h. behavioural data.

Where the method includes the creation of a profile, then preferably the user profile creation further comprises acquiring and storing said non-speech biometric data during profile creation.

In some embodiments, the step of determining whether said extracted biometric data matches stored biometric data associated with a consenting user profile comprises determining a match against a user profile of a logged-in user.

Suitably, the logging-in of a user may be responsive to the detection of biometric data associated with the user.

Preferably, the step of determining whether said extracted biometric data matches stored biometric data associated with a consenting user profile comprises determining a match against both consenting user profiles and non-consenting user profiles, wherein a non-consenting user profile is a user profile not associated with a record indicating consent to store biometric data.

The method may further include the initial step of creating a non-consenting user profile, wherein creating a non-consenting user profile comprises:
initialising a user profile associated with a third user;
receiving speech data of the third user;
extracting biometric data from said third user speech data;
storing said biometric data and associating said biometric data with said user profile; and
storing said user profile as a non-consenting user profile.

Advantageously, the method may further include the step of updating the stored biometric data associated with a consenting user profile on the basis of said extracted biometric data.

The invention also provides a computing system programmed to process an audio signal containing speech data, the computing system comprising:
an audio input;
a visual input;
a data store storing biometric data associated with a consenting user profile, wherein a consenting user profile is a user profile associated with a record indicating consent to store biometric data;
an interface to a storage archive storing speech data; and
processing means programmed to:
    extract biometric data from an audio signal received via the audio input;
    determine whether said extracted biometric data matches stored biometric data associated with a consenting user profile, wherein a consenting user profile is a user profile associated with a record indicating consent to store biometric data;
    if a match is determined to exist between said extracted biometric data and a consenting user profile, performing one or both steps of:
        (i) processing the speech data; and
        (ii) storing the speech data in the archive;
    if a match is not determined to exist between said extracted biometric data and a consenting user profile:
        delete the speech data within a predetermined time period.

The computing system of this aspect of the invention may be configured or programmed to implement the preferred features enumerated previously in relation to the method of the invention, and these features will not be enumerated here again for brevity.

There is further provided a method of processing image data, by a computing system, said image data including images of at least one user speaking, comprising the steps of:
    processing said image data of at least one user speaking to extract biometric data associated with said at least one user;
    determining whether said extracted biometric data matches stored biometric data associated with a consenting user profile, wherein a consenting user profile is a user profile associated with a record indicating consent to store biometric data;
    if a match is determined to exist between said extracted biometric data and a consenting user profile, performing one or both steps of:
        (i) processing the image data; and
        (ii) storing the image data in an archive;
    if a match is not determined to exist between said extracted biometric data and a consenting user profile:
        deleting the image data within a predetermined time period.

It will be appreciated that this method is analogous to the processing of audio data, but applies to image data of a user speaking, whether captured and processed in conjunction with audio data or otherwise.

It is possible to determine speech content from video, even without sound, with increasing accuracy. This can be thought of as lip reading by a computer or AI system. While the image or video data often provides a supplemental cue to increase the accuracy of the audio speech processing there are situations where the image data may be processed and/or stored in a separate stream from any audio data or indeed without audio data at all. Speech content can for instance be extracted from a user silently mouthing words (e.g. where for some reason the user is unable to speak or unwilling to do so), or in situations where the audio data is unreliable, e.g. where external noises mask the speech audio e.g. at a loud concert.

Such image data however may need to be treated with similar or perhaps even greater care as compared with audio data. Obtaining consent of the user, or consent on behalf of the user (such as where the user is a minor) is therefore often an important precondition for processing or storing the image data, or any biometric data based on the image data.

Preferably, the method of processing image data further comprises processing an audio signal containing speech data of said user, captured simultaneously with said image data, in accordance with the methods previously outlined herein.

Preferably, said step of processing the image data comprises analysing the image data to determine speech content based on the movements of the user's mouth, lips or jaw.

Further preferably, said step of analysing the data to determine speech content is combined with analysis of an audio signal containing speech data of said user, captured simultaneously with said image data, such that the determination of speech content is based on both audio-based and image-based inputs. However, the skilled person will appreciate from the foregoing that there will be applications and situations where the combination of audio and image analysis is not required, or not possible.

BRIEF DESCRIPTION OF THE DRAWINGS

The invention will now be further illustrated by the following description of embodiments thereof, given by way of example only with reference to the accompanying drawings, in which:
FIG. 2 is a representation of user profile and biometric data in the system of FIG. 1.

In FIG. 1 there is indicated at 10 a computerised system for processing an audio signal containing speech data. The system is implemented in a typical mobile handset or smartphone but which has bespoke functionality programmed within an app or program 12 which can be executed on the device.

Figure 1:
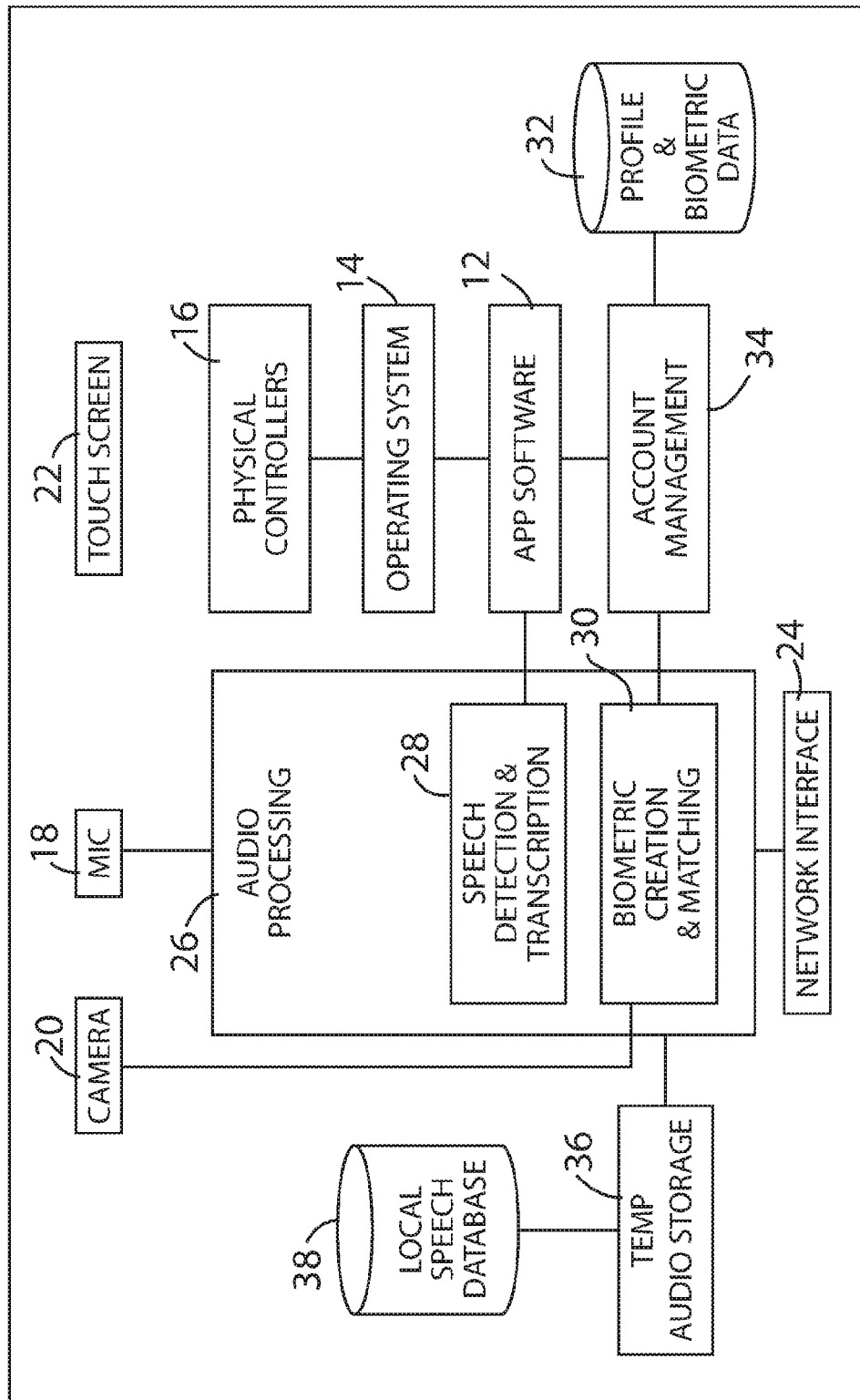
FIG. 1 is a block architecture diagram of a computerised system for processing an audio signal containing speech data.

It will be understood that as with conventional devices, the system 10 has a processor, a memory, and permanent storage, which are not shown but upon which the functional components shown in FIG. 1 operate in known manner under the overall control of an operating system 14 which interacts with the hardware via a plurality of physical controllers 16.

The device has a number of user input and output interfaces, typically including at least a microphone 18, camera 20 and a touchscreen 22, and also has a plurality of network interfaces 24 via which the device communicates wirelessly with remote networks, devices and systems. It will be appreciated that the interfaces are simplified, and modern devices may have many additional sensors, input and output devices, as well as having a plurality of microphone, cameras, network interfaces of different kinds, etc. The details of such implementation will of course be utilised in any particular implementation but do not affect the underlying basic operation of the invention as described herein.

The remaining components shown in FIG. 1 are portrayed in functional terms, and are typically provided by appropriately programmed general hardware available on a computing system. The designer of a system may choose to implement the functionality on a single processor or the functionality may be distributed across different devices and systems. Within a single device it is a matter of choice as to whether a single processor or multiple processors, including dedicated chips for e.g. audio processing, are used.

The audio input signal from the microphone 18 is directed to an audio processing function 26 where it is analysed and processed for the purposes of speech detection, speech recognition, and/or voice-to-text transcription 28. The details of these processes are many and varied, and the skilled person will be aware of numerous possibilities, such as speech processing libraries, language models and dictionaries, and software modules that are available or may be developed to enable speech input to be analysed, understood and passed to other processes, software, or remote devices to implement desired functionality. Some non-limiting examples of the kinds of functionality that may be achieved include voice searching, voice control of devices and systems, game playing, language learning, reading evaluation and learning, conversation with software agents, and so on.

Thus, while the system of FIG. 1 envisages that the recognised speech will be used by app software on the device the invention is in no way limited to this scenario. Similarly, while the implementation shown is a mobile handset, the core functionality as described herein can be implemented in computerised systems of all kinds, including desktop and laptop computers, servers, tablets, smart watches and other wearable devices, toys, electronic book readers, vehicle interfaces, games consoles, and so on. The implementation can be in a distributed or networked computerised system, with relatively dumb devices collecting audio inputs and forwarding them to more sophisticated systems for processing. Any system which can receive and process audio data, identify biometric data from speech within that data, and perform the determinations set out in the claims can implement the invention.

The audio processing function 26 includes a biometric creation and matching function 30, which can extract biometric data from an audio input, thereby characterising the audio characteristics of a speaker (or more than one speaker) whose speech is contained in the audio data. The function 30 has dual roles: the creation of biometric profiles from speech inputs, and the matching of biometric data extracted from an input against biometric data stored in a profile and biometric data store 32.

Biometric data extracted from speech may include the features commonly referred to a voiceprint. By extracting appropriate features from a person's voice the uniqueness of the physiology of the vocal tract and the articulatory properties can be captured to a high degree and can serve the purpose of authentication. In other words, by measuring the sounds a user makes while speaking, voice recognition software can measure the unique biological factors that, combined, produce her voice. Voiceprints can be measured passively as a user speaks naturally in conversation, or actively, if the speaker is made to speak a passphrase. Various technologies may be used to process and store voice prints including frequency estimation, hidden Markov models, Gaussian mixture models, pattern matching algorithms, neural networks, matrix representation, Vector Quantization and decision trees. Some systems also use "anti-speaker" techniques, such as cohort models, and world models. Spectral features are predominantly used in representing speaker characteristics. Voiceprint-type speech biometrics may be supplemented by, or in appropriate cases replaced by, biometric data that is based on the content of a user's speech, i.e. conversational patterns, vocabulary quirks and the like. New methods of feature extraction and machine learning could emerge in future years, which would also be appropriate to use in the extraction and matching of biometric data. The appropriateness of the biometric data models used will depend on the degree of confidence required and available from a given technology or combination of technologies.

The profile and biometric data store 32 operates under the control of an account management function 34 which maintains user accounts for users of the system 10 as a whole, or for users of a given service or piece of software (such as app software 12) hosted on the system.

Raw or processed speech data can be stored locally in temporary audio storage 36 for use in the immediate operation of the device, and may be stored on a longer term or permanent local speech database 38. In addition, or in the alternative, speech data can be transferred to a remote site (not shown) for example by transmitting the data over a network interface 24.

The decision on whether to store data beyond the immediate term of operation of the system (e.g. for more than a few hours or a couple of days) is controlled by the software operating on the system. Before a decision is taken to commit speech data to local or remote medium- to long-term storage, a determination is first made whether the data is associated with a user for whom an appropriate form of consent has been obtained.

Referring next to FIG. 2, a simplified representation of profile and biometric data store 32 is shown. A plurality of user profiles (only three are shown but there may be more or fewer depending on the use of the system) are stored, each of which may be associated with a user account on the device, service or software to which the data store 32 relates. A first user profile (Profile 0001 for user "Anna") includes an indication that the user in question is a child for whom various consents (to store speech, to upload the speech to a remote server, and to share it with third parties) have been obtained. Included in the profile is a digital signature of a consent record, permitting verification and authentication of the consent. Also included is a pointer to a biometric file ("Biometric File ID") containing the biometric data stored for the user in question, that file being stored in the Biometric Data Files area.

A second user profile (Profile 0002 for user "Dylan") is again indicated to be in respect of a child, and in this case, no consent is associated with the profile, meaning that the system is not authorised to permanently store or to transmit data arising from interaction with the user of this account, though it may process the data and temporarily store it for those purposes.

A third user profile (Profile 0003 for "Mark") is indicated to be a verified adult profile. In this case the verified status is associated with the user's identity in the records of an app store, with the email address of the user being the link to that account in the app store. The thoroughness with which the user's adult status may have been verified is at the discretion of the system's designers and operators. In some cases, a credit card transaction may be taken as sufficient proof of age; in other cases, the user may be required to upload identifying documentation that verifies the age of the user and/or the relationship between this user and the children for whom he or she is giving consent; in yet other cases, the operators of the system may rely on a third-party authentication service to verify the age of a verified adult; a further method is "email plus" where the user enters an email address and then needs to click on a consent button or link in the email to indicate consent. A follow-up email is sent 24 or 48 hours later to ensure that the consent was not given during a temporary unauthorised access to the user's email account.

In this case, the user "Mark" has an active account on the service or software that the account profiles relate to, as it can be seen that there is a consent provided to store data, but not to upload or share it. As a result, there is a link to Mark's biometric data file ID in his profile.

It is envisaged that there are cases where the user providing consent (in this case Mark) will not actively use the system and is simply recorded in a profile for the purposes of tracing the consent given to another user such as Anna. Thus, a parent using a piece of pre-school educational software, for example, would not be likely to actively use the software in a manner that their voice data would be collected and of interest. In such cases the system will not create any biometric profile for that user. Indeed it may not be required to create a user profile at all if the consent can be adequately verified from the information in the child's profile alone or with reference to a remote system in which consents are recorded. On the other hand, for a service like a search engine, a navigation system or a smart TV, all members of the family might have active profiles with interaction data stored.

It can be seen that user "Mark" has given consent to two users, namely Profile 0001 and Profile 0006 (which is not shown in FIG. 2). That consent will have typically been provided in an online transaction, and for each such consent there is a permanent verifiable record, for which the digital signature is provided in the user profile for the child in question. Alternative ways of recording and referencing consent are possible, including storing records of consent in a blockchain, using cookies, providing cryptographic signatures, electronically signed contracts, and so on. The important point is that there is an association between a biometric data set for the user "Anna" and a profile for which consent has been recorded in an acceptable manner (and equally, that there is no such consent recorded for user "Dylan").

Figure 3:
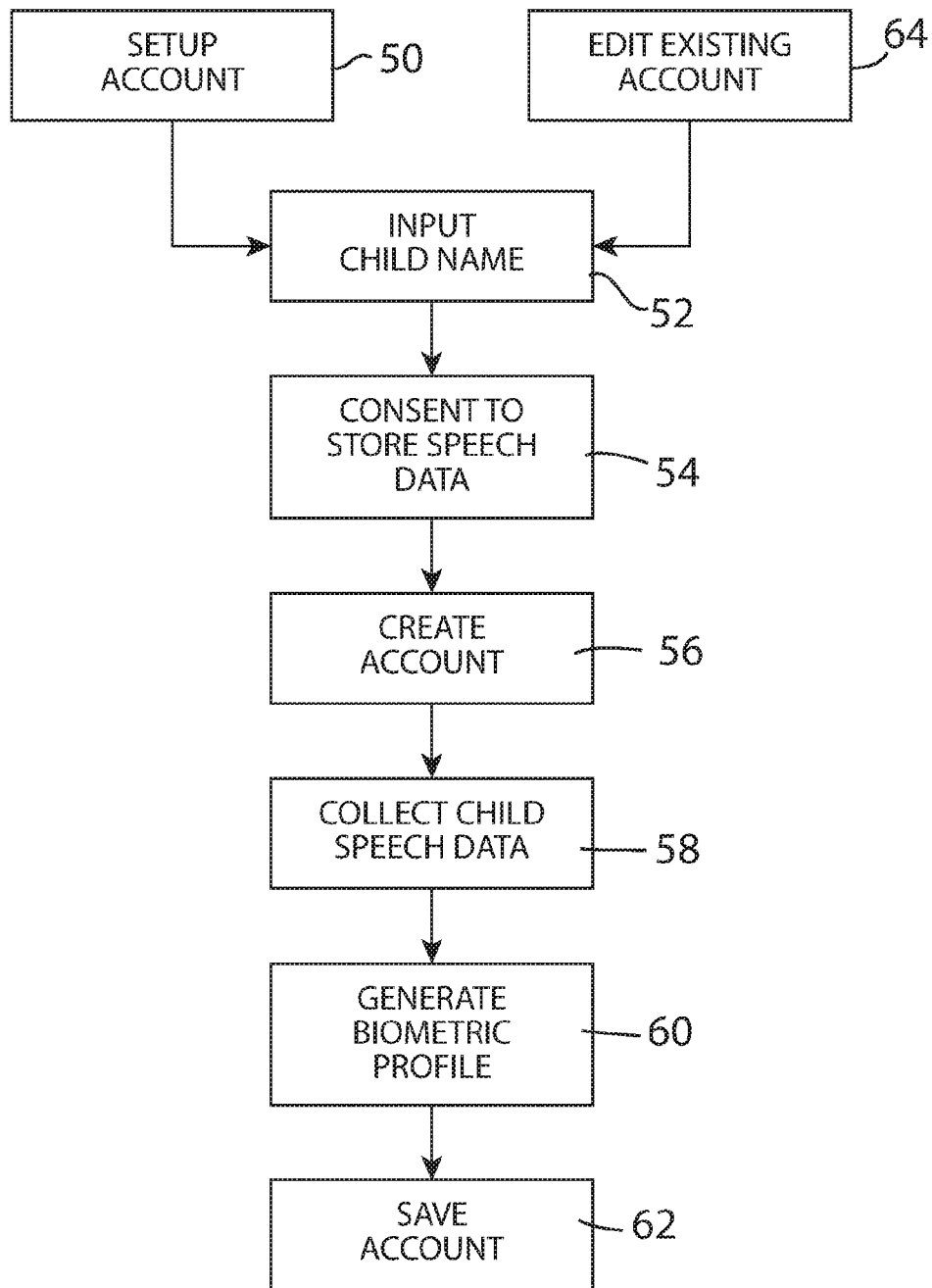
FIG. 3 is a flowchart of a method of creating a user account in the system of FIG. 1.

FIG. 3 shows an account or profile creation process, such as the process followed by Mark in providing consent for Anna. In step 50, Mark chooses to set up an account. In step 52, the child's name is entered (e.g. "Anna") using for example the touchscreen of the device, or alternatively this could occur on a website using a browser separate from the system 10 that will ultimately process the audio data.

In step 54, Mark provides consent to store Anna's speech data, the consent being verified to whatever standard is required by the designer or operator of the system. Once consent is verified, an account is created, step 56. Next, the child is prompted to use the system to allow collection of speech data, step 58. In step 60, the audio input from the child is processed to extract biometric data and generate a biometric profile.

The generation of a biometric profile need not be based on audio data alone. Other biometric data can be collected at the same time, or at a different time, or can be retrieved from another system, and added to Anna's biometric data. Typically, for example, the user's face may be recorded using a camera 20 of the system 10 (FIG. 1), and biometric data permitting face recognition added to the biometric data set on its creation. Such additional non-audio biometric data can strengthen the confidence of a match between data collected in actual use and the stored biometric data associated with Anna's profile. In addition to face recognition biometrics, fingerprints, iris patterns, retinal or palm blood vessel patterns, or hand geometries may be used as additional biometric data. Behavioral biometrics can also be used, such as how a person types, uses a mouse, or even how they pause when accomplishing a task. The mouth movements of a speaker are also highly individual and measureable, and there is ongoing research into many other biometric modalities. Any such biometrics create a profile of the user that can be compared to an expected profile. It is easily envisaged that consumer devices of the future may have biochemical or genetic sensors available to them which may collect biometric data from users.

Once the biometric data file has been created and linked to the user account or profile, the account is saved, step 62.

After an account has been created, the account can be edited as indicated in step 64. Any or all of the data in the profile or in the biometric data set can be added to, overwritten, or erased, and the consent(s) given can be extended, limited, confirmed or revoked. In use, the system itself may periodically or continually update the profile according to the use thereof by the user, and may update the biometric data as it acquires additional new data (voice, face, fingerprint, iris, etc.) from the use of the system, or from other system components that interact with the described system.

Figure 4:
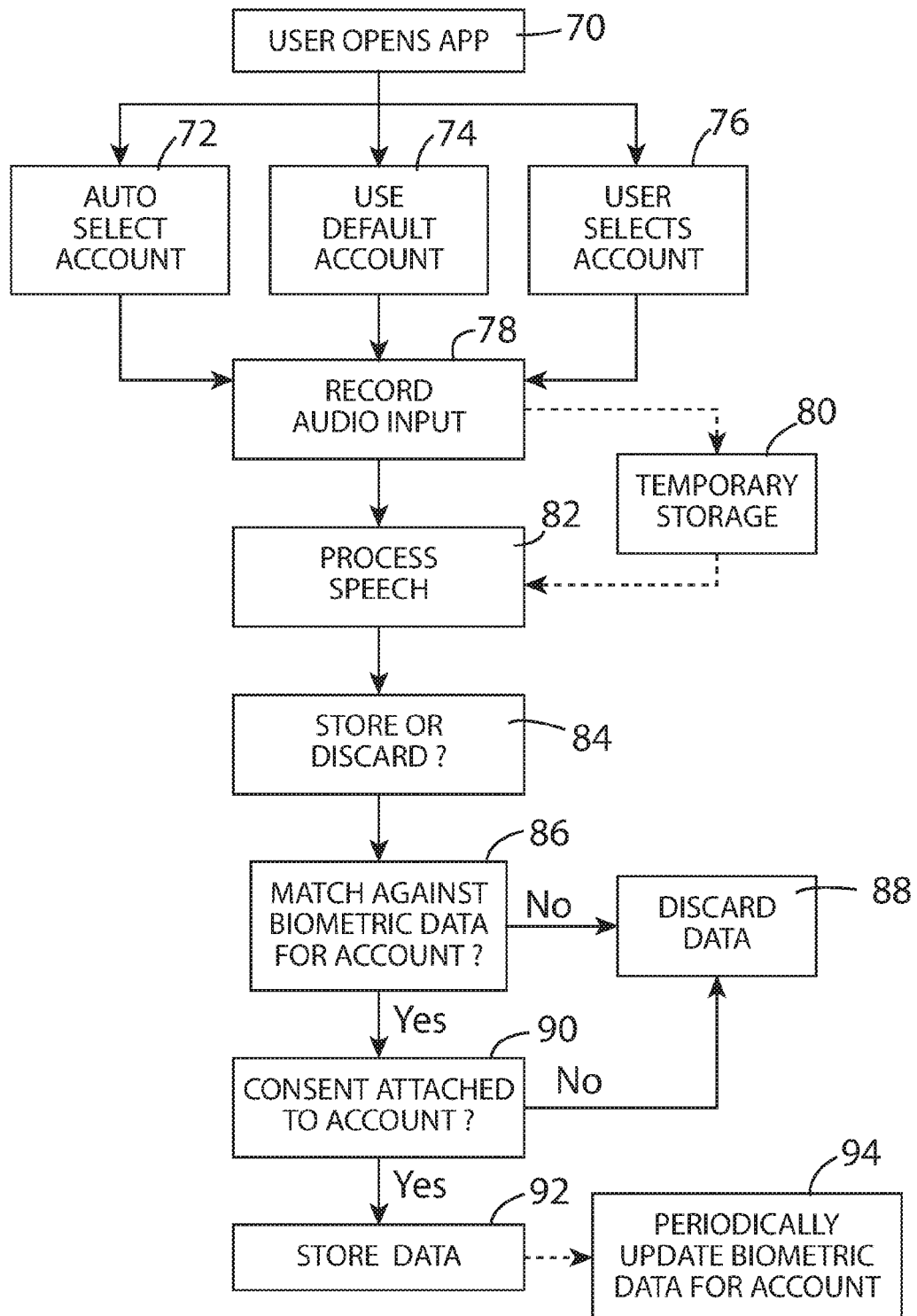
FIG. 4 is a flowchart of a method of processing audio signals containing speech data in the system of FIG. 1.

FIG. 4 shows the operation of the system as it is used in the collection and processing of audio data after an account has been set up. The flowchart of FIG. 4 has been described in relation to an app running on a handset, but again it is in no way limited to this specific scenario or implementation.

In step 70 a user opens the app providing voice functionality. An account is then selected. This may be an automatic selection 72, due to a user system login, or due to acquired biometric data (the user's face is recognised, for example). Alternatively, the system may use a default account (or perhaps the only available account), step 74. A further alternative is that the user selects an account, step 76.

After an account is selected, interaction occurs with the system, and audio input is recorded, step 78. As an optional step, and depending on the needs of the system, this may be temporarily stored, step 80, and will in most cases be buffered at least while it is being processed. In step 82, the speech of the user is processed according to the intended functionality of the system, service or software.

The choice then arises to store the data more permanently or to discard it, step 84. This determination may be made immediately, or at the termination of a session of interaction, or on the app being closed or system shutdown, or it may be according to a scheduled cleardown of data. In most cases, where child data has been (or may have been) collected, and compliance with legislation like COPPA or the GDPR is required, the decision will not be delayed beyond the immediate needs of processing and acting on the interaction with the child and sufficient resources are available.

In step 86, a match is determined between biometric data extracted from the audio input, and biometric data stored for the active user account. If no such match can be determined, then in this particular implementation the data is discarded or deleted, step 88.

As an alternative to step 86 and matching against the active user account, or as an option in the event that the speech data cannot be matched against that particular account, the system may simply search for a match against all known profiles having available biometric data to search against. If no such match is found, then as in step 88 the data will be deleted.

Step 86 is preferably implemented not simply to look for a positive match between extracted biometric data and one or more user profiles having stored biometric data. Rather, the test is whether the biometric data as a whole can all be matched, or at least that there is no significant amount of biometric data in the input that is not associated with a user account. If there is any significant amount of biometric data that cannot be matched against a user account, then the data may be unsafe to store and should be discarded in this preferred implementation.

If the extracted biometric data can be matched against a user profile, then it must be determined that there is a valid consent attached to that profile, step 90. In some systems, such as system 10 illustrated in FIGS. 1 and 2, the consents will be explicitly referenced in the profile. In other systems, the existence of a valid user profile can only occur upon the provision of a verified consent, and so all user profiles in the system will be associated with a record of consent having been given (e.g. by a remote system which authorised or caused the creation of the user profile). A further alternative is that, following the identification of a matching user profile, a remote system is queried to verify whether the matching profile has a stored consent on the remote system. In all cases, if the matching user profile does not have a consent attached to or associated with it, according to the implementation rules chosen, the data is discarded or caused to be deleted, step 88.

If the matching user profile (or profiles, in the case where the extracted biometric data from the input is associated with multiple users), then the data is stored, step 92. The storage can be local, or the data can be transferred to a remote data store, or both. Finally, as indicated in step 94 and as described earlier in relation to FIG. 3, the extracted biometric data may be used to update the stored biometric data for the user account.

The embodiments described above are concerned primarily with the processing of audio data and on controlling how such data is stored. However, they can be adapted to the processing of image data (which means primarily video data but could include still imagery also). This can be done as a supplement to the audio processing, or as an alternative.

For example in FIG. 1, the speech detection and transcription function, the biometric creation and matching, and the profile and biometric data storage could all be implemented to operate on the basis of video data rather than audio data, or to receive both audio and video inputs as appropriate. The profiles and the biometric data in FIG. 2 could be adapted accordingly. In FIG. 3, the consent would be gathered and the biometric profiles generated in relation to image data rather than, or in addition to, audio speech data. In FIG. 4, the process would be adapted to the recording and processing of image data, and again this could either supplement or replace the audio processing.

In other words, the skilled person could choose to implement the same system functionality using the design principles in FIGS. 1-4, but adapted to or extended to image data. This could both control the storage of such image data or the biometrics derivable therefrom, and supplement or substitute for the speech recognition or verification functionality by using video analysis of mouth movements.

What is claimed is:

1. A method comprising:
 storing one or more user profiles that are each associated with one of one or more users of a computing system, wherein each user profile is associated with biometric data that uniquely characterizes a respective user of the one or more users of the computing system, and wherein at least one of the one or more user profiles is a consenting user profile, wherein each consenting user profile of a respective user indicates consent to store biometric data of the respective user;
 determining first biometric data associated with a first speaker based at least in part on speech content derived from first image data of the first speaker;
 determining whether the first biometric data associated with the first speaker corresponds to any biometric data associated with any consenting user profile indicating consent to store biometric data of a respective user; and
 responsive to determining that the first biometric data associated with the first speaker does not correspond to any voiceprint associated with any consenting user profile:
 deleting the first image data within a time period.

2. The method of claim 1 further comprising:
 processing second image data of a second speaker, wherein processing the second image data of the second speaker comprises extracting, from the second image data of the second speaker, second biometric data associated with the second speaker;
 determining whether the second biometric data associated with the second speaker corresponds to any biometric data associated with any consenting user profile indicating consent to store biometric data of a respective user; and
 responsive to determining that the second biometric data extracted from the second image data of the second speaker corresponds to a voiceprint associated with a consenting user profile, performing at least one of:
 processing the second image data; or
 storing the second image data in an archive.

3. The method of claim 1, wherein determining the first biometric data associated with the first speaker comprises analysing the first image data to determine the speech content based on movements of one or more facial features of the first speaker.

4. The method of claim 3, wherein the one or more facial features comprise one or more of a mouth, lips or jaw.

5. The method of claim 1, wherein determining the first biometric data associated with the first speaker comprises extracting, from the first image data of the first speaker, image-based biometric data associated with the first speaker.

6. The method of claim 5, wherein determining the first biometric data associated with the first speaker is further based on first speech data of the first speaker.

7. The method of claim 6, wherein determining the first biometric data associated with the first speaker further comprises extracting, from the first speech data of the first speaker, speech-based biometric data associated with the first speaker.

8. The method of claim 1, further comprising creating a consenting user profile, wherein creating a consenting user profile comprises:
 verifying credentials of a first user of the computing system against a data source to ensure that the first user is authorized to provide consent to store speech data;
 initializing a user profile associated with a second user, on instruction of the first user, wherein the second user is a child and the first user is a parent of the second user;
 receiving speech data of the second user;
 extracting biometric data from the speech data of the second user;
 storing the biometric data from the speech data of the second user and associating the biometric data from the speech data of the second user with the user profile associated with the second user; and
 storing the user profile associated with the second user as a consenting user profile.

9. The method of claim 1, further comprising matching additional biometric data acquired from the first speaker against stored biometric data associated with a respective consenting user profile.

10. The method of claim 9, wherein the additional biometric data is selected from:
   a. image data of a face of the first speaker;
   b. iris pattern data;
   c. fingerprint data;
   d. hand geometry data;
   e. palm blood vessel pattern data;
   f. retinal blood vessel pattern data;
   g. mouth movement data; or
   h. behavioural data.

11. The method of claim 1, further comprising creating a non-consenting user profile, wherein creating a non-consenting user profile comprises:
   initializing a second user profile associated with a second user;
   receiving speech data of the second user;
   extracting second biometric data from the speech data of the second user;
   storing the second biometric data and associating the second biometric data with the second user profile; and
   storing the second user profile as a non-consenting user profile.

12. A non-transitory computer-readable medium comprising instructions, which when executed by a processor, cause the processor to perform operations comprising:
   storing one or more user profiles that are each associated with one of one or more users of a computing system, wherein each user profile is associated with biometric data that uniquely characterizes a respective user of the one or more users of the computing system, and wherein at least one of the one or more user profiles is a consenting user profile, wherein each consenting user profile of a respective user indicates consent to store biometric data of the respective user;
   determining first biometric data associated with a first speaker based at least in part on speech content derived from first image data of the first speaker;
   determining whether the first biometric data associated with the first speaker corresponds to any biometric data associated with any consenting user profile indicating consent to store biometric data of a respective user; and
   responsive to determining that the first biometric data associated with the first speaker does not correspond to any voiceprint associated with any consenting user profile:
   deleting the first image data within a time period.

13. The non-transitory computer-readable medium of claim 12, the operations further comprising:
   processing second image data of a second speaker, wherein processing the second image data of the second speaker comprises extracting, from the second image data of the second speaker, second biometric data associated with the second speaker;
   determining whether the second biometric data associated with the second speaker corresponds to any biometric data associated with any consenting user profile indicating consent to store biometric data of a respective user; and
   responsive to determining that the second biometric data extracted from the second image data of the second speaker corresponds to a voiceprint associated with a consenting user profile, performing at least one of:
   processing the second image data; or
   storing the second image data in an archive.

14. The non-transitory computer-readable medium of claim 12, wherein determining the first biometric data associated with the first speaker comprises analysing the first image data to determine the speech content based on movements of one or more facial features of the first speaker, wherein the one or more facial features comprise one or more of a mouth, lips or jaw.

15. The non-transitory computer-readable medium of claim 12, wherein determining the first biometric data associated with the first speaker comprises extracting, from the first image data of the first speaker, image-based biometric data associated with the first speaker.

16. The non-transitory computer-readable medium of claim 15, wherein determining the first biometric data associated with the first speaker is further based on first speech data of the first speaker.

17. The non-transitory computer-readable medium of claim 16, wherein determining the first biometric data associated with the first speaker further comprises extracting, from the first speech data of the first speaker, speech-based biometric data associated with the first speaker.

18. A system comprising:
   a memory; and
   a processing device coupled to the memory, to perform operations comprising:
   storing one or more user profiles that are each associated with one of one or more users of a computing system, wherein each user profile is associated with biometric data that uniquely characterizes a respective user of the one or more users of the computing system, and wherein at least one of the one or more user profiles is a consenting user profile, wherein each consenting user profile of a respective user indicates consent to store biometric data of the respective user;
   determining first biometric data associated with a first speaker based at least in part on speech content derived from first image data of the first speaker;
   determining whether the first biometric data associated with the first speaker corresponds to any biometric data associated with any consenting user profile indicating consent to store biometric data of a respective user; and
   responsive to determining that the first biometric data associated with the first speaker does not correspond to any voiceprint associated with any consenting user profile:
   deleting the first image data within a time period.

19. The system of claim 18, the operations further comprising:
   processing second image data of a second speaker, wherein processing the second image data of the second speaker comprises extracting, from the second image data of the second speaker, second biometric data associated with the second speaker;
   determining whether the second biometric data associated with the second speaker corresponds to any biometric data associated with any consenting user profile indicating consent to store biometric data of a respective user; and
   responsive to determining that the second biometric data extracted from the second image data of the second speaker corresponds to a voiceprint associated with a consenting user profile, performing at least one of:
   processing the second image data; or
   storing the second image data in an archive.

20. The system of claim 18, wherein determining the first biometric data associated with the first speaker comprises analysing the first image data to determine the speech content based on movements of one or more facial features of the first speaker, wherein the one or more facial features comprise one or more of a mouth, lips or jaw.

* * * * *